US010277303B2

(12) United States Patent
Fertl et al.

(10) Patent No.: US 10,277,303 B2
(45) Date of Patent: Apr. 30, 2019

(54) VEHICLE-BASED FEMTOCELL WITH PRIORITIZATION OF DATA PACKETS ON THE BASIS OF THE REQUIRED INTERNET SERVICE QUALITY

(71) Applicant: Bayerische Motoren Werke Aktiengesellschaft, Munich (DE)

(72) Inventors: Peter Fertl, Munich (DE); Jose Francisco Monserrat Del Rio, Valencia (ES)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/498,893

(22) Filed: Apr. 27, 2017

(65) Prior Publication Data

US 2017/0230102 A1 Aug. 10, 2017

Related U.S. Application Data

(63) Continuation of application No. PCT/EP2015/065196, filed on Jul. 3, 2015.

(30) Foreign Application Priority Data

Oct. 28, 2014 (DE) .................. 10 2014 221 956

(51) Int. Cl.
*H04B 7/155* (2006.01)
*H04W 84/00* (2009.01)
(Continued)

(52) U.S. Cl.
CPC ........... *H04B 7/15521* (2013.01); *H04B 1/38* (2013.01); *H04B 7/15528* (2013.01);
(Continued)

(58) Field of Classification Search
CPC .... H04B 7/15521; H04B 1/38; H04B 17/309; H04L 69/22
(Continued)

(56) References Cited

U.S. PATENT DOCUMENTS 6,445,924 B1* 9/2002 Rasanen ............... H04W 36/20
455/436
6,657,960 B1* 12/2003 Jeffries ................... H04L 47/10
370/230.1
(Continued)

FOREIGN PATENT DOCUMENTS

| EP | 2 442 605 A1 | 4/2012 |
| EP | 2 501 200 A1 | 9/2012 |
| EP | 2 627 113 A1 | 8/2013 |

OTHER PUBLICATIONS

PCT/EP2015/065196, International Search Report dated Oct. 6, 2015 (Three (3) pages).
(Continued)

*Primary Examiner* — Hai V Nguyen
(74) *Attorney, Agent, or Firm* — Crowell & Moring LLP

(57) ABSTRACT

A device for a relay transceiver in a mobile communication system, which includes a base station transceiver and a packet data network interface, includes at least one transceiver module configured to communicate with at least one mobile transceiver and with the base station transceiver. The device further includes a control module configured to determine, on the basis of a data packet received by the at least one mobile transceiver, information about a quality criterion of a service associated with the data packet, and to establish, on the basis of the information about the quality criterion, a data connection to the packet data network interface via the base station transceiver.

14 Claims, 10 Drawing Sheets

US 10,277,303 B2

Page 2

(51) Int. Cl.
*H04B 17/309* (2015.01)
*H04B 1/38* (2015.01)
*H04L 29/06* (2006.01)
*H04W 76/12* (2018.01)
*H04W 28/24* (2009.01)

(52) U.S. Cl.
CPC ........... *H04B 17/309* (2015.01); *H04L 69/22* (2013.01); *H04W 84/005* (2013.01); H04L 65/80 (2013.01); H04W 28/24 (2013.01); H04W 76/12 (2018.02)

(58) Field of Classification Search
USPC .................................................. 455/9
See application file for complete search history.

(56) References Cited

U.S. PATENT DOCUMENTS

| | | | | |
|---|---|---|---|---|
| 6,674,718 B1* | 1/2004 | Heddes | H04L 47/10 | 370/230 |
| 6,701,389 B2* | 3/2004 | Gorti | H04L 47/10 | 710/29 |
| 6,937,566 B1* | 8/2005 | Forslow | H04L 1/0017 | 370/231 |
| 7,015,809 B1* | 3/2006 | Sayers | H01Q 1/246 | 340/539.1 |
| 7,042,394 B2* | 5/2006 | Sayers | G01S 3/18 | 342/432 |
| 7,221,268 B2* | 5/2007 | Sayers | H01Q 1/246 | 340/539.1 |
| 7,280,073 B2* | 10/2007 | Sayers | G01S 3/18 | 342/432 |
| 7,657,634 B2* | 2/2010 | Zheng | H04L 47/14 | 709/219 |
| 7,738,426 B2* | 6/2010 | Smith | H04W 88/16 | 370/331 |
| 7,835,762 B2* | 11/2010 | Sendonaris | H04W 52/283 | 455/456.1 |
| 7,881,287 B2* | 2/2011 | Hu | H04Q 3/0045 | 370/353 |
| 7,933,236 B2* | 4/2011 | Wang | H04L 45/12 | 370/328 |
| 7,944,871 B2* | 5/2011 | Imamura | H04B 7/15542 | 370/315 |
| 8,184,810 B2* | 5/2012 | Furuyama | G06K 19/073 | 380/239 |
| 8,195,120 B2* | 6/2012 | Khan | H04L 65/1016 | 455/403 |
| 8,223,717 B2* | 7/2012 | Dillon | H04L 29/12188 | 370/331 |
| 8,270,908 B2* | 9/2012 | Wang | H04B 7/2606 | 370/329 |
| 8,583,032 B2* | 11/2013 | Imamura | H04B 7/155 | 455/7 |
| 8,634,826 B1 | 1/2014 | Cope et al. | | |
| 8,660,035 B2* | 2/2014 | Zhang | H04B 7/15507 | 370/255 |
| 8,687,601 B2* | 4/2014 | Xu | H04B 7/0628 | 370/334 |
| 8,724,472 B2* | 5/2014 | Huang | H04B 7/15528 | 370/236 |
| 8,780,744 B2* | 7/2014 | Song | H04W 76/27 | 370/252 |
| 8,798,067 B2* | 8/2014 | Morris | H04L 45/00 | 370/252 |
| 8,811,416 B2* | 8/2014 | Ozawa | H04M 7/0072 | 370/401 |
| 8,830,893 B2* | 9/2014 | Pons | H04L 45/38 | 370/312 |
| 8,837,495 B2* | 9/2014 | Takahashi | H04W 76/15 | 370/395.54 |
| 8,923,752 B2* | 12/2014 | Morioka | H04B 7/15528 | 455/450 |
| 9,148,820 B2* | 9/2015 | Yang | H04W 28/08 | |
| 9,155,075 B2* | 10/2015 | Song | H04W 76/27 | |
| 9,160,566 B2* | 10/2015 | Ulupinar | H04L 12/4633 | |
| 9,184,825 B2* | 11/2015 | Kimura | H04B 7/155 | |
| 9,264,882 B2* | 2/2016 | Miyagawa | H04W 8/06 | |
| 9,350,662 B2* | 5/2016 | Shuman | H04W 76/23 | |
| 9,351,173 B2* | 5/2016 | Giloh | H04L 12/4633 | |
| 9,356,988 B2* | 5/2016 | Shuman | H04L 65/80 | |
| 9,369,941 B2* | 6/2016 | Shoshan | H04W 76/10 | |
| 9,370,005 B2* | 6/2016 | Horiuchi | H04W 16/14 | |
| 9,386,536 B2* | 7/2016 | Meyer | H04W 52/242 | |
| 9,398,473 B2* | 7/2016 | Goerke | H04W 24/02 | |
| 9,408,124 B2* | 8/2016 | Vargantwar | H04W 36/14 | |
| 9,433,032 B1* | 8/2016 | Ghadge | H04W 84/08 | |
| 9,491,575 B2* | 11/2016 | Edge | H04W 4/90 | |
| 9,532,292 B2* | 12/2016 | Miyagawa | H04W 36/0033 | |
| 9,565,117 B2* | 2/2017 | Dahod | H04L 12/66 | |
| 9,622,118 B2* | 4/2017 | Melin | H04W 36/0022 | |
| 9,648,517 B2* | 5/2017 | Giloh | H04L 12/4633 | |
| 9,681,393 B2* | 6/2017 | Mohlmann | H04B 7/15535 | |
| 9,699,589 B2* | 7/2017 | Novak | H04W 4/70 | |
| 9,705,649 B2* | 7/2017 | Boudreau | H04B 7/026 | |
| 9,706,340 B2* | 7/2017 | Kim | H04W 80/04 | |
| 9,722,749 B2* | 8/2017 | Seo | H04L 1/0026 | |
| 9,769,871 B2* | 9/2017 | Giloh | H04L 45/54 | |
| 9,807,668 B2* | 10/2017 | Teyeb | H04W 36/34 | |
| 9,877,139 B2* | 1/2018 | Venkatachalam | H04W 4/70 | |
| 9,887,852 B2* | 2/2018 | Oyman | H04W 56/00 | |
| 9,960,926 B2* | 5/2018 | Oyman | H04W 56/00 | |
| 10,142,423 B2* | 11/2018 | Verger | H04L 65/1083 | |
| 2002/0077151 A1* | 6/2002 | Matthews | H04W 52/343 | 455/561 |
| 2003/0007452 A1* | 1/2003 | Gorti | H04L 47/10 | 370/229 |
| 2004/0102182 A1* | 5/2004 | Reith | H04M 15/00 | 455/410 |
| 2006/0035676 A1* | 2/2006 | Sayers | H01Q 1/246 | 455/562.1 |
| 2006/0066484 A1* | 3/2006 | Sayers | G01S 3/18 | 342/432 |
| 2006/0071794 A1* | 4/2006 | Sayers | H01Q 1/246 | 340/572.7 |
| 2006/0071853 A1* | 4/2006 | Sayers | G01S 3/18 | 342/432 |
| 2006/0229896 A1* | 10/2006 | Rosen | G06Q 10/10 | 705/321 |
| 2006/0246900 A1* | 11/2006 | Zheng | H04L 47/14 | 455/435.3 |
| 2007/0047523 A1* | 3/2007 | Jiang | H04M 3/02 | 370/352 |
| 2007/0053363 A1* | 3/2007 | Chen | H04L 29/06027 | 370/395.21 |
| 2007/0097945 A1* | 5/2007 | Wang | H04L 45/12 | 370/349 |
| 2007/0206500 A1* | 9/2007 | Mollah | H04B 7/2606 | 370/235 |
| 2007/0220573 A1* | 9/2007 | Chiussi | H04L 12/189 | 725/114 |
| 2007/0297393 A1* | 12/2007 | Furukawa | H04L 12/66 | 370/352 |
| 2008/0090575 A1* | 4/2008 | Barak | H04W 16/10 | 455/444 |
| 2008/0132166 A1* | 6/2008 | Park | H04W 52/08 | 455/15 |
| 2008/0214182 A1* | 9/2008 | Wang | H04B 7/2606 | 455/423 |
| 2008/0267128 A1* | 10/2008 | Bennett | H04W 36/0022 | 370/331 |
| 2008/0285500 A1* | 11/2008 | Zhang | H04B 7/15507 | 370/315 |
| 2008/0310397 A1* | 12/2008 | Hu | H04Q 3/0045 | 370/352 |
| 2009/0047898 A1* | 2/2009 | Imamura | H04B 7/155 | 455/7 |
| 2009/0092072 A1* | 4/2009 | Imamura | H04B 7/15542 | 370/315 |

(56) References Cited

U.S. PATENT DOCUMENTS

| | | | |
|---|---|---|---|
| 2009/0156213 A1* | 6/2009 | Spinelli | H04W 92/02 455/436 |
| 2009/0232019 A1* | 9/2009 | Gupta | H04L 12/287 370/252 |
| 2009/0233544 A1* | 9/2009 | Oyman | H04B 7/15592 455/7 |
| 2009/0245108 A1* | 10/2009 | Wu | H04L 47/10 370/233 |
| 2009/0252132 A1* | 10/2009 | Song | H04W 76/15 370/338 |
| 2009/0279519 A1* | 11/2009 | Brisebois | H04W 52/242 370/338 |
| 2009/0323636 A1* | 12/2009 | Dillon | H04L 29/12188 370/331 |
| 2010/0034083 A1* | 2/2010 | Prakash | H04W 28/18 370/230.1 |
| 2010/0054141 A1* | 3/2010 | Youn | H04H 20/42 370/252 |
| 2010/0067533 A1* | 3/2010 | Yoshida | H04L 43/0847 370/401 |
| 2010/0103863 A1* | 4/2010 | Ulupinar | H04L 29/12207 370/315 |
| 2010/0103865 A1* | 4/2010 | Ulupinar | H04L 29/12207 370/315 |
| 2010/0202330 A1* | 8/2010 | Pons | H04L 45/38 370/310 |
| 2010/0234071 A1* | 9/2010 | Shabtay | H04B 7/0408 455/562.1 |
| 2010/0248619 A1* | 9/2010 | Senarath | H04B 7/2606 455/11.1 |
| 2010/0254399 A1* | 10/2010 | Shin | H04L 12/5692 370/415 |
| 2010/0260129 A1* | 10/2010 | Ulupinar | H04L 12/4633 370/329 |
| 2010/0265873 A1* | 10/2010 | Yi | H04W 72/087 370/315 |
| 2010/0272006 A1* | 10/2010 | Bertrand | H04B 7/2606 370/315 |
| 2010/0278153 A1* | 11/2010 | Horiuchi | H04B 7/15521 370/335 |
| 2010/0297937 A1* | 11/2010 | Kim | H04B 7/1555 455/11.1 |
| 2010/0303012 A1* | 12/2010 | Atarius | H04L 65/1016 370/328 |
| 2011/0009056 A1* | 1/2011 | Hanson | H04B 7/15535 455/9 |
| 2011/0022720 A1* | 1/2011 | Song | H04L 47/20 709/232 |
| 2011/0038480 A1* | 2/2011 | Lin | H04W 12/04 380/270 |
| 2011/0075675 A1* | 3/2011 | Koodli | H04L 12/14 370/401 |
| 2011/0081903 A1* | 4/2011 | Cai | H04W 36/0058 455/424 |
| 2011/0085471 A1* | 4/2011 | Zhang | H04W 16/00 370/254 |
| 2011/0092172 A1* | 4/2011 | Stille | H04W 76/45 455/90.2 |
| 2011/0149886 A1* | 6/2011 | Xu | H04B 7/0628 370/329 |
| 2011/0158155 A1* | 6/2011 | Park | H04W 40/12 370/315 |
| 2011/0158166 A1* | 6/2011 | Lee | H04W 28/06 370/328 |
| 2011/0182231 A1* | 7/2011 | Wang | H04L 45/12 370/315 |
| 2011/0206094 A1* | 8/2011 | Zhang | H04W 76/12 375/211 |
| 2011/0235514 A1* | 9/2011 | Huang | H04B 7/15528 370/235 |
| 2011/0299501 A1* | 12/2011 | Keller | H04W 36/0022 370/331 |
| 2011/0305196 A1 | 12/2011 | Kurokawa et al. | |
| 2011/0317589 A1* | 12/2011 | Jolma | H04W 40/248 370/255 |
| 2012/0014317 A1* | 1/2012 | Rahman | H04W 88/16 370/328 |
| 2012/0026903 A1* | 2/2012 | Song | H04W 76/27 370/252 |
| 2012/0063415 A1 | 3/2012 | Yee | |
| 2012/0099461 A1 | 4/2012 | Yi et al. | |
| 2012/0106459 A1* | 5/2012 | Ozawa | H04L 12/6418 370/328 |
| 2012/0140666 A1* | 6/2012 | Takahashi | H04W 76/15 370/252 |
| 2012/0149296 A1* | 6/2012 | Sawai | H04B 7/2606 455/7 |
| 2012/0166618 A1* | 6/2012 | Dahod | H04L 12/66 709/224 |
| 2012/0176962 A1* | 7/2012 | Kimura | H04B 7/155 370/315 |
| 2012/0231797 A1* | 9/2012 | Van Phan | H04B 7/15592 455/437 |
| 2012/0238208 A1* | 9/2012 | Bienas | H04W 8/24 455/41.2 |
| 2012/0250601 A1* | 10/2012 | Choi | H04W 88/04 370/315 |
| 2012/0294163 A1* | 11/2012 | Turtinen | H04W 72/042 370/252 |
| 2013/0016649 A1* | 1/2013 | Damnjanovic | H04W 88/04 370/315 |
| 2013/0021932 A1* | 1/2013 | Damnjanovic | H04W 52/0229 370/252 |
| 2013/0059585 A1* | 3/2013 | Giloh | H04L 45/54 455/436 |
| 2013/0070664 A1* | 3/2013 | Nagata | H04B 7/15542 370/315 |
| 2013/0128873 A1* | 5/2013 | Eipe | H04W 76/10 370/338 |
| 2013/0163424 A1* | 6/2013 | Goerke | H04W 24/02 370/235 |
| 2013/0166718 A1* | 6/2013 | Okuyama | H04L 67/24 709/223 |
| 2013/0203342 A1* | 8/2013 | Morioka | H04B 7/15528 455/7 |
| 2013/0225123 A1* | 8/2013 | Adjakple | H04W 4/24 455/406 |
| 2013/0295926 A1* | 11/2013 | Michel | H04W 36/0061 455/434 |
| 2013/0315181 A1* | 11/2013 | Song | H04W 76/27 370/329 |
| 2013/0324130 A1* | 12/2013 | Maruta | H04W 36/00 455/436 |
| 2014/0003328 A1* | 1/2014 | Mildh | H04W 72/048 370/315 |
| 2014/0036722 A1* | 2/2014 | Giloh | H04L 12/4633 370/254 |
| 2014/0086177 A1* | 3/2014 | Adjakple | H04W 12/08 370/329 |
| 2014/0092736 A1* | 4/2014 | Baillargeon | H04W 72/1226 370/230 |
| 2014/0192638 A1* | 7/2014 | Taneja | H04W 28/0268 370/229 |
| 2014/0213260 A1* | 7/2014 | Miyagawa | H04W 36/0033 455/436 |
| 2014/0219083 A1* | 8/2014 | Mandyam | H04L 65/4061 370/230 |
| 2014/0219252 A1* | 8/2014 | Miyagawa | H04W 36/0033 370/331 |
| 2014/0222890 A1* | 8/2014 | Zhu | H04L 65/1033 709/203 |
| 2014/0293776 A1* | 10/2014 | Yang | H04W 28/08 370/229 |
| 2014/0293867 A1* | 10/2014 | Horiuchi | H04W 16/14 370/315 |
| 2015/0003318 A1* | 1/2015 | Meyer | H04B 7/15535 370/315 |

(56) References Cited

U.S. PATENT DOCUMENTS

| | | | | |
|---|---|---|---|---|
| 2015/0016330 A1* | 1/2015 | Schwartz | H04W 76/10 | 370/312 |
| 2015/0024757 A1* | 1/2015 | Bulakci | H04W 36/0088 | 455/437 |
| 2015/0087314 A1* | 3/2015 | Weber | H04W 16/26 | 455/437 |
| 2015/0131650 A1* | 5/2015 | Shuman | H04L 65/80 | 370/352 |
| 2015/0131657 A1* | 5/2015 | Oyman | H04W 56/00 | 370/390 |
| 2015/0237556 A1* | 8/2015 | Giloh | H04L 45/54 | 455/436 |
| 2015/0237559 A1* | 8/2015 | Giloh | H04L 45/54 | 455/440 |
| 2015/0237564 A1* | 8/2015 | Wang | H04B 7/155 | 370/315 |
| 2015/0288530 A1* | 10/2015 | Oyman | H04W 56/00 | 370/312 |
| 2015/0296422 A1* | 10/2015 | Melin | H04W 36/0022 | 370/331 |
| 2015/0365790 A1* | 12/2015 | Edge | H04W 4/90 | 455/404.2 |
| 2015/0365876 A1* | 12/2015 | Wang | H04L 45/12 | 370/315 |
| 2016/0021007 A1* | 1/2016 | Shuman | H04W 76/23 | 370/235 |
| 2016/0021587 A1* | 1/2016 | Vargantwar | H04W 36/14 | 370/331 |
| 2016/0037358 A1* | 2/2016 | Kimura | H04B 7/155 | 370/315 |
| 2016/0057723 A1* | 2/2016 | Horn | H04W 60/00 | 455/435.2 |
| 2016/0057724 A1* | 2/2016 | Horn | H04W 60/005 | 455/435.1 |
| 2016/0057729 A1* | 2/2016 | Horn | H04W 48/18 | 455/458 |
| 2016/0105369 A1* | 4/2016 | Nadas | H04L 47/2408 | 370/392 |
| 2016/0165548 A1* | 6/2016 | Mohlmann | H04B 7/15535 | 455/522 |
| 2016/0212653 A1* | 7/2016 | Wang | A61B 10/0051 | |
| 2016/0212794 A1* | 7/2016 | Szabo | H04W 52/0206 | |
| 2016/0227385 A1* | 8/2016 | Ahmad | H04L 65/4061 | |
| 2016/0227467 A1* | 8/2016 | Tomici | H04W 48/16 | |
| 2016/0227518 A1* | 8/2016 | Li | H04W 72/042 | |
| 2016/0234124 A1* | 8/2016 | Tomici | H04W 28/24 | |
| 2016/0249254 A1* | 8/2016 | Giloh | H04L 12/4633 | |
| 2016/0323758 A1* | 11/2016 | Goerke | H04W 24/02 | |
| 2016/0330011 A1* | 11/2016 | Lee | H04L 5/0066 | |
| 2016/0360447 A1* | 12/2016 | Ghadge | H04W 84/08 | |
| 2016/0373987 A1* | 12/2016 | Ahmad | H04W 74/0833 | |
| 2017/0034749 A1* | 2/2017 | Chandramouli | H04W 4/90 | |
| 2017/0149667 A1* | 5/2017 | Dahod | H04L 12/66 | |
| 2017/0257886 A1* | 9/2017 | Adjakple | H04W 12/08 | |
| 2017/0272978 A1* | 9/2017 | Giloh | H04L 12/4633 | |
| 2018/0152309 A1* | 5/2018 | Oyman | H04W 56/00 | |

OTHER PUBLICATIONS

German Search Report issued in German counterpart application No. 10 2014 221 956.6 dated Jun. 5, 2015, with Statement of Relevancy (Nine (9) pages).

* cited by examiner

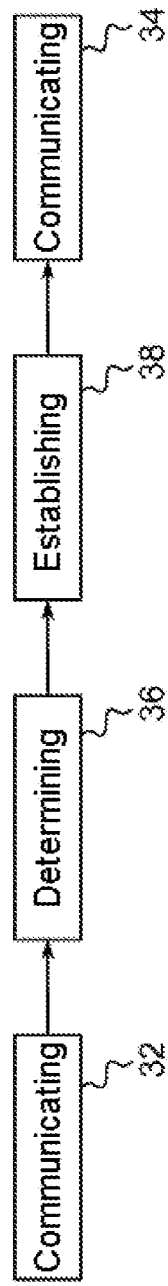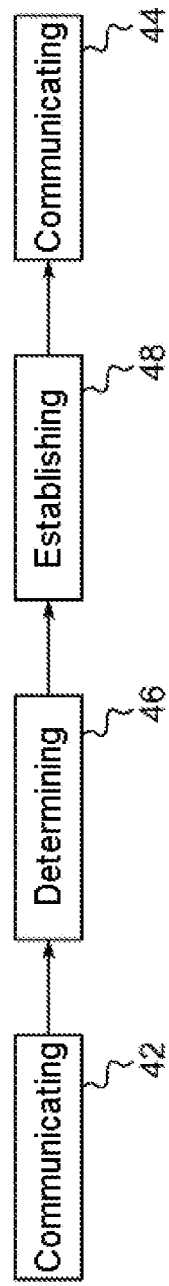

VEHICLE-BASED FEMTOCELL WITH PRIORITIZATION OF DATA PACKETS ON THE BASIS OF THE REQUIRED INTERNET SERVICE QUALITY

CROSS REFERENCE TO RELATED APPLICATIONS

This application is a continuation of PCT International Application No. PCT/EP2015/065196, filed Jul. 3, 2015, which claims priority under 35 U.S.C. § 119 from German Patent Application No. 10 2014 221 956.6, filed Oct. 28, 2014, the entire disclosures of which are herein expressly incorporated by reference.

BACKGROUND AND SUMMARY OF THE INVENTION

Exemplary embodiments relate to a device for a relay transceiver, a device for a network component, a vehicle, a method for a relay transceiver, a method for a network component, and a program comprising a program code.

Mobile communication systems are always faced with new challenges: modern smartphones (intelligent portable terminals) enable the use of a multiplicity of new services, such as e.g. online navigation, music or video streaming, online communication and mobile internet. Since these services often make up a large part of the functionality of a smartphone, the network operators must attempt to achieve the widest possible coverage of a mobile communication system.

Besides wired base station transceivers linked to the network of the network operator via a cable, there are also relay transceivers which themselves establish a wireless connection to the mobile communication system and then provide this connection for mobile transceivers. In this case, by virtue of larger antennas, a better power supply and a more favorable location (e.g. on a hill or with antennas outside a vehicle), relay transceivers can usually establish a better connection to a mobile communication system than the mobile terminals themselves, and improve the linking of the mobile transceivers to the mobile communication system.

Mobile broadband services are often used precisely in vehicles, whether on the way to work or when traveling. In this regard, the demand for broadband internet within vehicles has risen sharply in recent years since many customers do not want to dispense with internet-based entertainment services even when traveling. However, the mobile radio signals received within vehicles are significantly attenuated by the damping that the signal experiences as a result of the shell of the vehicle. As a result, the reception quality is detrimentally affected and there are a large number of interrupted calls within the vehicle. This problem may get worse in the future if the manufacturers, for emission reasons, switch to metal film windows that approximately transform the vehicle into a Faraday cage. Here, too, mobile relay transceivers may be required in the future in order to provide an improved reception quality for the occupants of the vehicle.

The relay transceivers themselves are then connected to the mobile communication system via a base station transceiver. For this purpose, they set up a protocol tunnel (e.g. an encrypted internet protocol security tunnel (also called IPSec-tunnel) to the network of the mobile radio operator, which then forwards the data packets and telephony data to the respective communication partners. The use of the tunnels means that all inquiries arrive in the network of the mobile radio operator in a bundled fashion, which increases security in the mobile communication system since the tunnel can thus be directed e.g. even via potentially insecure connections of cooperation partners.

Further information about relay transceivers can be found for instance in:

B. Zafar, S. Gherekhloo, and M. Haardt, "Analysis of Multihop Relaying Networks: Communication Between Range-Limited and Cooperative Nodes", IEEE Vehicular Technology Magazine, vol. 7, No. 3, pp. 40-47, September 2012;

M. Ilyas, S. A. Ahson (editors), "IP Multimedia Subsystem (IMS) Handbook", CRC Press, 2008;

3GPP TS 36.413, "Evolved Universal Terrestrial Radio Access Network (E-UTRAN); S1 Application Protocol (S1AP)";

US20120063415 A1, "IMS femtocell for voice, data and video", Jung Yee, Wi-Lan, Inc., 2012;

US 20110305196 A1, "Communication system, femto-cell base station, authentication device, communication method, and memory medium", Osamu Kurokawa, Kazuki Eguchi, Yasuo Kanazawa, Yasuhiro, Watanabe, Hiroaki Akiyama, Takayuki Kido, Akatsuki Minami, 2011; and Y. Yinghua, N. Vora, J. P. Sairanen, M. Sahasrabudhe, "Enabling local breakout from eNB in LTE networks", IEEE International Conference on Communications (ICC), pp. 6982-6986, 10-15 Jun. 2012.

There is therefore a need to provide an improved concept for relay transceivers.

Exemplary embodiments are based on the insight that it may be expedient to perform a prioritization of data packets that place specific quality demands on the data connection, such as internet telephony and video streaming, for example, since the content of the data packets that are forwarded by the relay transceiver is unknown to the base station, in particular on account of possible encryptions.

Some exemplary embodiments may make this possible by the use of a control module that is integrated for example into a relay transceiver. The control module may then analyze data packets, for example, and draw conclusions about the required connection quality therefrom. In this case, the control module could e.g. extract service quality (also called Quality of Service, (QoS)) indicators already present from the header data of the data packets, or analyze the content of the data packets by pattern recognition and determine information about quality criteria. On the basis of these quality criteria, in exemplary embodiments the control module may then instruct the mobile communication system to set up data connections corresponding to said quality criteria. The data packets may then be transferred via the respective data connection corresponding to the associated quality criterion. This enables both the secure transfer of the data between relay transceiver and network of the mobile communication system, and the transfer of data in accordance with their quality criteria.

In further exemplary embodiments, the requirement for establishing a connection in accordance with a quality criterion may also come from the side of the network of the mobile radio operator. For example, a network component at the transition between a network of the operator of the mobile communication system could, analogously to the previous exemplary embodiment, analyze data packets and set up data connections to the relay transceiver which correspond to the respective quality criteria.

Exemplary embodiments therefore provide a device for a relay transceiver of a mobile communication system. The mobile communication system furthermore has a base station transceiver and a packet data network interface. In this case, the device comprises at least one transceiver module designed to communicate with at least one mobile transceiver and with the base station transceiver. The relay transceiver furthermore comprises a control module designed to determine, on the basis of a data packet received from the at least one mobile transceiver, information about a quality criterion of a service associated with the data packet, and to establish, on the basis of the information about the quality criterion, at least one data connection to the packet data network interface via the base station transceiver. This makes it possible to take account of quality criteria when transferring data packets from the relay transceiver to the network of the operator of the mobile communication system, in particular via a wireless connection between the relay transceiver and the base station transceiver.

In some exemplary embodiments, the control module is designed to establish via the at least one transceiver module data connections with different quality criteria to the base station transceiver. By way of example, the control module may furthermore be designed to establish, on the basis of the information about the quality criterion of the service associated with the data packet, a data connection with a corresponding quality criterion to the packet data network interface via the base station transceiver in order to transfer data packets assigned to data services with identical quality criteria via the same connection to the base station transceiver. There is the possibility that as a result the number of connections which are active in parallel decreases and the data packets are simultaneously transferred in accordance with their quality criteria. In some exemplary embodiments, a number of different connections may accordingly correspond to the number of different quality criteria and data packets of services with identical quality criteria may be bundled in one connection, e.g. in a common protocol tunnel.

In exemplary embodiments, the control module may furthermore be designed to determine, on the basis of a plurality of received data packets, information about a plurality of quality criteria about a plurality of data services associated with the data packets, and to set up, on the basis of the information about the plurality of quality criteria, a plurality of data connections to the base station transceiver. In this regard, in exemplary embodiments, a plurality of data connections may simultaneously be set up in accordance with the information about the quality criteria, for utilizing a plurality of data services in accordance with the information about the quality criteria.

In some exemplary embodiments, the relay transceiver may be a mobile relay transceiver, for example in order to provide the occupants of vehicles with a connection to a mobile communication system.

In further exemplary embodiments, the mobile communication system may furthermore have a coordination module, a link connection and a network component. In this case, the relay transceiver may be connected via the link connection to the network component, which receives the data packets of the mobile transceiver. In exemplary embodiments, the coordination module may be designed to set up the at least one data connection in accordance with the information about the quality criterion, and the control module may furthermore be designed to communicate the information about the quality criterion via an internet protocol multimedia subsystem interface to the coordination module. As a result, in exemplary embodiments, it is possible to utilize the mechanisms for taking account of quality criteria which are already present in radio technologies. Exemplary embodiments in this respect also provide a relay transceiver which comprises the device described above, and a mobile communication system having a relay transceiver which comprises a device described above.

In some exemplary embodiments, the control module may be designed to determine the information about the quality criterion of the service associated with the data packet by extracting the quality criterion from the header data of the data packet. The control module may furthermore also be designed to determine the information about the quality criterion of the service associated with the data packet by pattern analysis of the content of the data packet. Through the use of different mechanisms for recognizing information about quality criteria, the control module in exemplary embodiments may determine both explicitly defined and implicitly recognized information about quality criteria.

In exemplary embodiments, the control module may be designed to communicate in an encrypted fashion via the data connection, which increases the security of the link connection against interception. Exemplary embodiments in this respect also provide a relay transceiver which comprises the device described above, and a mobile communication system having a relay transceiver which comprises a device described above.

Exemplary embodiments furthermore provide a device for a network component for providing a data service to at least one mobile transceiver in a mobile communication system. The mobile communication system furthermore has a relay transceiver. In this case, the device comprises at least one interface module designed to communicate via the one relay transceiver with the at least one mobile transceiver, and to communicate with at least one communication partner of the at least one mobile transceiver. It furthermore has a control module designed to determine, on the basis of a data packet received from the at least one communication partner of the at least one mobile transceiver, information about a quality criterion of a service associated with the data packet, and to establish, on the basis of the information about the quality criterion, at least one data connection via a packet data network interface of the mobile communication system to the relay transceiver. In this regard, e.g. the interface to the network of an operator of a mobile communication system may also undertake the determination of the information about quality criteria and set up the data connection in accordance with the information about the quality criteria in order to utilize the latter for the link connection.

In some exemplary embodiments, the control module may be designed to establish via the at least one interface module connections with different quality criteria to the mobile transceiver via the relay transceiver. There is furthermore the possibility that the control module is furthermore designed to establish, on the basis of the information about the quality criterion of the service associated with the data packet, at least one data connection with a corresponding quality criterion to the relay transceiver, and to transfer data packets assigned to data services with identical quality criteria via the same data connection to the relay transceiver. There is the possibility that, as a result, the number of connections which are active in parallel decreases and the data packets are simultaneously transferred in accordance with their quality criteria.

In further exemplary embodiments, the control module may furthermore be designed to determine, on the basis of a plurality of received data packets, information about a plurality of quality criteria about a plurality of data services associated with the data packets, and to set up, on the basis of the information about the plurality of quality criteria, a plurality of data connections to the relay transceiver. In this regard, in exemplary embodiments, a plurality of connections may simultaneously be set up in accordance with the information about the quality criteria, for utilizing a plurality of data services in accordance with the information about the quality criteria.

In exemplary embodiments, the mobile communication system may furthermore have a coordination module. The coordination module may be designed for example to set up the at least one data connection in accordance with the information about the quality criterion. The control module could furthermore be designed to communicate the information about the quality criterion via an internet protocol multimedia subsystem interface to the coordination module. As a result, in exemplary embodiments, it is possible to utilize the mechanisms for taking account of quality criteria which are already present in radio technologies.

There is the possibility that the control module is furthermore designed to determine the information about the quality criterion of the service associated with the data packet by extracting the quality criterion from the header data of the data packet, and/or that the control module is designed to determine the information about the quality criterion of the service associated with the data packet by pattern analysis of the content of the data packet. Through the use of different mechanisms for recognizing information about quality criteria, the control module in exemplary embodiments may determine both explicitly defined and implicitly recognized information about quality criteria.

In exemplary embodiments, the control module may furthermore be designed to communicate in an encrypted fashion via the link connection, which increases the security of the link connection against interception. Exemplary embodiments in this respect also provide a network component which comprises the device described above, and a mobile communication system having a network component which comprises a device described above, and a mobile communication system having a relay transceiver which comprises a device described above and/or a network component which comprises a device described above.

A vehicle comprising a device for a mobile transceiver may also be one exemplary embodiment, wherein the relay transceiver is mobile and is furthermore designed to communicate with mobile transceivers of vehicle occupants. This makes it possible, in exemplary embodiments, to utilize a larger area for antennas and a better power supply by the vehicle in order to obtain a higher reception quality.

Exemplary embodiments provide a method for a relay transceiver in a mobile communication system according to the above description. The mobile communication system furthermore has a base station transceiver. The method comprises communicating with at least one mobile transceiver; communicating with the base station transceiver; determining information about a quality criterion of a service associated with a data packet received from the at least one mobile transceiver; and establishing a data connection to the packet data network interface via the base station transceiver on the basis of the information about the quality criterion.

Exemplary embodiments furthermore provide a method for a network component for providing a data service to at least one mobile transceiver in a mobile communication system. The mobile communication system furthermore has a relay transceiver. The method comprises communicating via the one relay transceiver with the at least one mobile transceiver, communicating with at least one communication partner of the at least one mobile transceiver, determining information about a quality criterion of a service associated with a data packet received from the at least one communication partner of the at least one mobile transceiver, on the basis of a data packet received from the at least one communication partner of the at least one mobile transceiver, and establishing a data connection via a packet data network interface of the mobile communication system to the relay transceiver on the basis of the information about the quality criterion.

Exemplary embodiments furthermore provide a program/computer program comprising a program code for carrying out at least one of the methods described above when the program code is executed on a computer, a processor, a controller or a programmable hardware component. Exemplary embodiments also provide a digital storage medium which is machine- or computer-readable and which has electronically readable control signals which can interact with a programmable hardware component such that one of the methods described above is performed.

Other objects, advantages and novel features of the present invention will become apparent from the following detailed description of one or more preferred embodiments when considered in conjunction with the accompanying drawings.

BRIEF DESCRIPTION OF THE DRAWINGS

Further advantageous configurations are described in greater detail below on the basis of the exemplary embodiments illustrated in the drawings, but in general there is no restriction overall to said exemplary embodiments. In the figures:

FIG. 10 shows a block diagram of a flowchart of one exemplary embodiment of a method for a relay transceiver; and FIG. 11 shows a block diagram of a flowchart of one exemplary embodiment of a method for a network component.

DETAILED DESCRIPTION OF THE DRAWINGS

Figure 1:
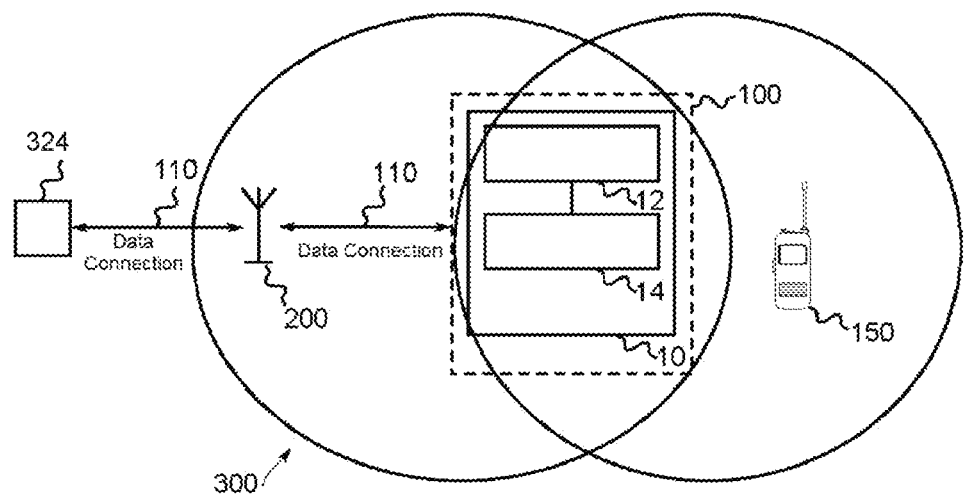
FIG. 1 shows a block diagram of one exemplary embodiment of a relay transceiver in a mobile communication system having a base station transceiver and a mobile transceiver.

Various exemplary embodiments will now be described more thoroughly with reference to the accompanying drawings illustrating some exemplary embodiments. In the figures, the thickness dimensions of lines, layers and/or regions may be illustrated in an exaggerated manner for the sake of clarity.

In the following description of the accompanying figures, which show only a few exemplary embodiments by way of example, identical reference signs may designate identical or comparable components. Furthermore, summarizing reference signs may be used for components and objects which occur multiply in an exemplary embodiment or in a drawing but are described jointly with regard to one or more features. Components or objects which are described with identical or summarizing reference signs may be embodied identically, but if appropriate also differently, with regard to individual, a plurality or all of the features, for example their dimensionings, provided that the description does not explicitly or implicitly reveal something to the contrary.

Although exemplary embodiments may be modified and altered in various ways, exemplary embodiments in the figures are illustrated as examples and are described thoroughly herein. It should be clarified, however, that the intention is not to restrict exemplary embodiments to the forms respectively disclosed, rather that exemplary embodiments are intended to cover all functional and/or structural modifications, equivalents and alternatives which lie within the scope of the invention. Identical reference signs designate identical or similar elements throughout the description of the figures.

It should be noted that one element which is designated as "connected" or "coupled" to another element may be directly connected or coupled to the other element or intervening elements may be present. By contrast, if one element is designated as "directly connected" or "directly coupled" to another element, no intervening elements are present. Other terms used to describe the relationship between elements should be interpreted in a similar way (e.g. "between" vis-à-vis "directly therebetween", "adjacent" vis-à-vis "directly adjacent", etc.).

The terminology used herein serves only to describe specific exemplary embodiments, and is not intended to restrict the exemplary embodiments. As used herein, the singular forms "a", "an" and "the" are also intended to include the plural forms as long as the context does not unambiguously indicate something to the contrary. Furthermore, it should be clarified that the expressions such as e.g. "includes", "including", "has", "comprises", "comprising" and/or "having", as used herein, indicate the presence of stated features, whole numbers, steps, work sequences, elements and/or components, but do not exclude the presence or the addition of one or more features, whole numbers, steps, work sequences, elements, components and/or groups thereof.

Unless defined otherwise, all terms used herein (including technical and scientific terms) have the same meaning ascribed to them by a person of average skill in the art in the field to which the exemplary embodiments belong. Furthermore, it should be clarified that expressions, e.g. those defined in dictionaries generally used, should be interpreted as if they had the meaning which is consistent with their meaning in the context of the relevant art, and should not be interpreted in an idealized or excessively formal sense, as long as this is not expressly defined herein.

The integration of the internet protocol multimedia subsystem (IMS) in small cells is known from the conventional field. However, the focus here is on the integration of different radio interfaces, on the linking of the mobile transceivers or on the use of quality criteria in the linking of the mobile transceivers to the small cell. This stems from the fact that it is assumed that small cells are connected via wired broadband internet, and that the connection between the mobile transceiver and the small cell constitutes the eye of the needle for a transmission capacity.

The situation is different in relay transceivers: only a small number of mobile transceivers use the small cell; the eye of the needle in this case is the link connection via radio, the connection between the relay transceiver and the network via a base station transceiver.

Radio technologies such as Universal Mobile Telecommunication System (UMTS) or Long Term Evolution (LTE) support the provisioning of radio resources in accordance with a quality criterion (also called QoS provisioning) and the different treatment of data services. The negotiation of the parameters here takes place between the mobility and management unit (MME, abbreviation of Mobility Management Entity), which are logically connected. In the case of a relay transceiver, the relay transceiver for the mobile communication system is a normal user having an internet protocol data connection to the internet. Assuming that the relay transceiver sets up an IPSec (Internet Protocol Security) tunnel to the network, all the data are then transferred via the link connection in an encrypted manner, such that the packet data network interface (PDN-GW, abbreviation of Packet Data Network GateWay) cannot analyze the data packets with the aid of data traffic flow templates (TFT stands for Traffic Flow Template) and differentiate and, if necessary, prioritize different data services. Ultimately, in the conventional field, in some scenarios it is thus not possible to ensure end-to-end prioritization of data services according to quality criteria.

FIG. 1 illustrates one exemplary embodiment of a device 10 for a relay transceiver 100 in a mobile communication system 300.

Exemplary embodiments may therefore make use of a transceiver/mobile radio apparatus which is designed for the communication of data via a mobile radio system 300 with a server or computer or some other communication partner which can be reached for example via the internet or the World Wide Web (WWW) or some other network. The mobile radio system/communication system 300 may correspond for example to one of the mobile radio systems which are standardized by corresponding standardization committees, such as e.g. the 3rd Generation Partnership Project (3GPP) group. By way of example, these include the Global System for Mobile Communications (GSM), Enhanced Data Rates for GSM Evolution (EDGE), GSM EDGE Radio Access Network (GERAN), the Universal Terrestrial Radio Access Network (UTRAN) or the Evolved UTRAN (E UTRAN), such as e.g. the Universal Mobile Telecommunication System (UMTS), Long Term Evolution (LTE) or LTE-Advanced (LTE-A), or else mobile radio systems of other standards, such as e.g. the Worldwide Interoperability for Microwave Access (WIMAX), IEEE802.16 or Wireless Local Area Network (WLAN), IEEE802.11, and generally a system based on a Time Division Multiple Access (TDMA) method, Frequency Division Multiple Access (FDMA) method, Code Division Multiple Access (CDMA) method, Orthogonal Frequency Division Multiple Access (OFDMA) method or some other technology or multiple access method. Hereinafter, the terms mobile radio system, mobile radio network and mobile communication system are used synonymously.

The mobile communication system 300 furthermore has a base station transceiver 200 and a packet data network interface 324. The device 10 comprises at least one transceiver module 12 designed to communicate with at least one mobile transceiver 150 and with the base station transceiver 200. In exemplary embodiments, the transceiver module 12 may contain typical transmitter and/or receiver components. The latter may encompass, for example, one or more antennas, one or more filters, one or more mixers, one or more amplifiers, one or more diplexers, one or more duplexers, etc. In exemplary embodiments, the transceiver module 12 may use different radio technologies, for example UMTS, LTE, one of the technologies mentioned above, a Wireless Local Access Network (WLAN) or further radio technologies.

In addition, the device 10 comprises a control module 14 coupled to the transceiver module 12. The control module 14 is designed to determine, on the basis of a data packet received from the at least one mobile transceiver 150, information about a quality criterion of a service associated with the data packet and to establish, on the basis of the information about the quality criterion, at least one data connection 110 to the packet data network interface 324 via the base station transceiver 200. In exemplary embodiments, the control module 14 may correspond to an arbitrary controller or processor or a programmable hardware component. By way of example, the control module 14 may also be realized as software that is programmed for a corresponding hardware component. In this respect, the control module 14 may be implemented as programmable hardware with correspondingly adapted software. In this case, arbitrary processors, such as digital signal processors (DSPs), may be used. In this case, exemplary embodiments are not restricted to a specific type of processor. Arbitrary processors or else a plurality of processors are conceivable for implementing the control module 14. By way of example, a minimum bandwidth (e.g. a guaranteed average data rate or a data throughput), a maximum delay (such as occurs in real-time services, for example, in the sense of a guaranteed delivery time), or a maximum bit error rate would be conceivable as quality criterion. Information about quality criteria are often combined under the acronym QoS (stands for Quality of Service). In exemplary embodiments, a data connection 110 to the packet data network interface 324 may correspond, for instance, to a protocol conversion context for data transfer of packet data (also called Evolved Packet-switched System (EPS)-Bearer).

A base station transceiver or a base station (these terms may be used equivalently) may be designed to communicate with one or more active mobile radio apparatuses and to communicate in or neighboring a supply or coverage area of another base station transceiver or base station, e.g. as macrocell base station or as small-cell base station. Embodiments may thus encompass a mobile communication system comprising one or more mobile radio terminals and one or more base stations, wherein the base station transceivers may provide macrocells or small cells, e.g. pico-, metro- or femtocells. A mobile transceiver or mobile radio terminal may correspond to a smartphone (intelligent telephone), a cellphone, a user apparatus, a radio apparatus, a mobile, a mobile station, a laptop, a notebook, a personal computer (PC), a personal digital assistant (PDA), a universal serial bus (USB) stick or adapter, an automobile, etc. A mobile transceiver may also be designated as "User Equipment (UE)" or mobile in accordance with 3GPP terminology.

A base station transceiver or a base station, at least from the point of view of a mobile radio terminal, may be situated in a stationary or at least fixedly connected part of the network or system. A base station transceiver or a base station may also correspond to a remote radio head, a relay station, a transfer point, an access point, a radio apparatus, a macrocell, a small cell, a microcell, a femtocell, a metrocell, etc. A base station or a base station transceiver is thus understood as a logical concept of a node/unit for providing a radio carrier or radio connections via the air interface via which access to a mobile radio network is obtained for a terminal/mobile transceiver.

A base station or a base station transceiver may constitute a wireless interface for mobile radio terminals to a wired network. The radio signals used may be radio signals standardized by 3GPP or generally radio signals matching one or more of the systems mentioned above. In this regard, a base station or a base station transceiver may correspond to a NodeB, an eNodeB, a Base Transceiver Station (BTS), an access point, a remote radio head, a transfer point, a relay station, etc., which may be subdivided into further functional units.

A mobile radio terminal or mobile transceiver may be assigned to or registered at a base station or cell. The term cell relates to a coverage area of the radio services that are provided by a base station, e.g. by a NodeB (NB), an eNodeB (eNB), a remote radio head, a transfer point, a relay station, etc. A base station may provide one or more cells on one or more carrier frequencies. In some embodiments, a cell may also correspond to a sector. By way of example, sectors may be formed with sector antennas designed for covering an angular segment around an antenna location. In some embodiments, a base station may be configured for example for the operation of three or six cells or sectors (e.g. 120° in the case of three cells and 60° in the case of six cells). A base station may comprise a plurality of sector antennas. Hereinafter, the terms cell and base station may also be used synonymously. Furthermore, fixed and mobile base stations are differentiated, wherein mobile base stations may also function as mobile relay stations.

In other words, in the embodiments the mobile communication system may also comprise a heterogeneous cell network (HetNet) having different cell types, e.g. cells having closed user groups (also called "Closed Subscriber Group CSG"), and open cells and cells of different sizes, such as e.g. macrocells and small cells, wherein the coverage area of a small cell is smaller than the coverage area of a macrocell. A small cell may correspond to a metrocell, a microcell, a picocell, a femtocell, etc. The coverage areas of the individual cells are provided by the base stations for their supply areas and depend on the transmission powers of the base stations and the interference conditions in the respective area. In some embodiments, the coverage area of a small cell may at least partly be surrounded by a supply area of another cell or partly correspond to or overlap the supply area of an e.g. macrocell. Small cells may be used to extend the capacity of the network. A metrocell may therefore be used to cover a smaller area than a macrocell; by way of example, metrocells are used to cover a road or a segment in a conurbation. For a macrocell, the coverage area may have a diameter of the order of magnitude of one kilometer or more; for a microcell, the coverage area may have a diameter of less than one kilometer; and a picocell may have a coverage area having a diameter of less than 100 m. A femtocell may have the smallest coverage area and it may be used to cover for example a household area, a motor vehicle area or a gate area at an airport, i.e. its transmission area may have a diameter of less than 50 m.

Base station transceivers which at the back end in turn communicate with a base station of the mobile communication system via a radio connection are also called relay transceivers. In exemplary embodiments, they provide a cell, for example a small cell, for mobile transceivers, but themselves use a radio connection to communicate with the mobile communication system and to relay the inquiries of the mobile transceivers. In this case, for example as a result of larger antennas, a better power supply and a more expedient location (e.g. on a hill or with antennas outside a vehicle), relay transceivers may establish a better connection to a mobile communication system and improve the linking of the mobile transceivers to the mobile communication system. A special form of a relay transceiver is the mobile relay transceiver, which, in contrast to the relay transceiver, does not have a fixed location, but rather is movable. In exemplary embodiments, mobile relay transceivers may be used for example in vehicles, for instance motor vehicles, trains or ships, and there may provide the occupants of the vehicle with a cell and cordless services corresponding thereto.

In exemplary embodiments, the control module 14 may be designed to establish via the at least one transceiver module 12 data connections 110 with different quality criteria to the packet data network interface 324 via the base station transceiver 200. The control module 14 may be designed for example to establish, on the basis of the information about the quality criterion of the service associated with the data packet, at least one data connection 110 with a corresponding quality criterion to the packet data network interface 324 via the base station transceiver 200 and to transfer data packets assigned to data services with identical quality criteria via the same connection to the base station transceiver 200. In this case, data packets may consist of header, payload and end data, for example. Header data and header information may have information about the data packet, for example the source and the destination of the data packet in the form of addresses, the length of the data packet, checking and recovery information, for example according to the Cyclic Redundancy Check (CRC) method. The payload data comprise the data which are intended to be transferred. Data services that may benefit from specific quality criteria, under certain circumstances, are for example voice telephony over the internet (VoIP, stands for Voice over Internet Protocol) and video and audio services.

In some exemplary embodiments, the control module 14 may be designed to determine, on the basis of a plurality of received data packets, information about a plurality of quality criteria about a plurality of data services associated with the data packets, and to set up, on the basis of the information about the plurality of quality criteria, a plurality of data connections 110 to the packet data network interface 324 via the base station transceiver 200. In this regard, the control module 14 may establish for example separate data connections for voice telephony, video services and other data packets which satisfy different quality criteria.

Figure 2:
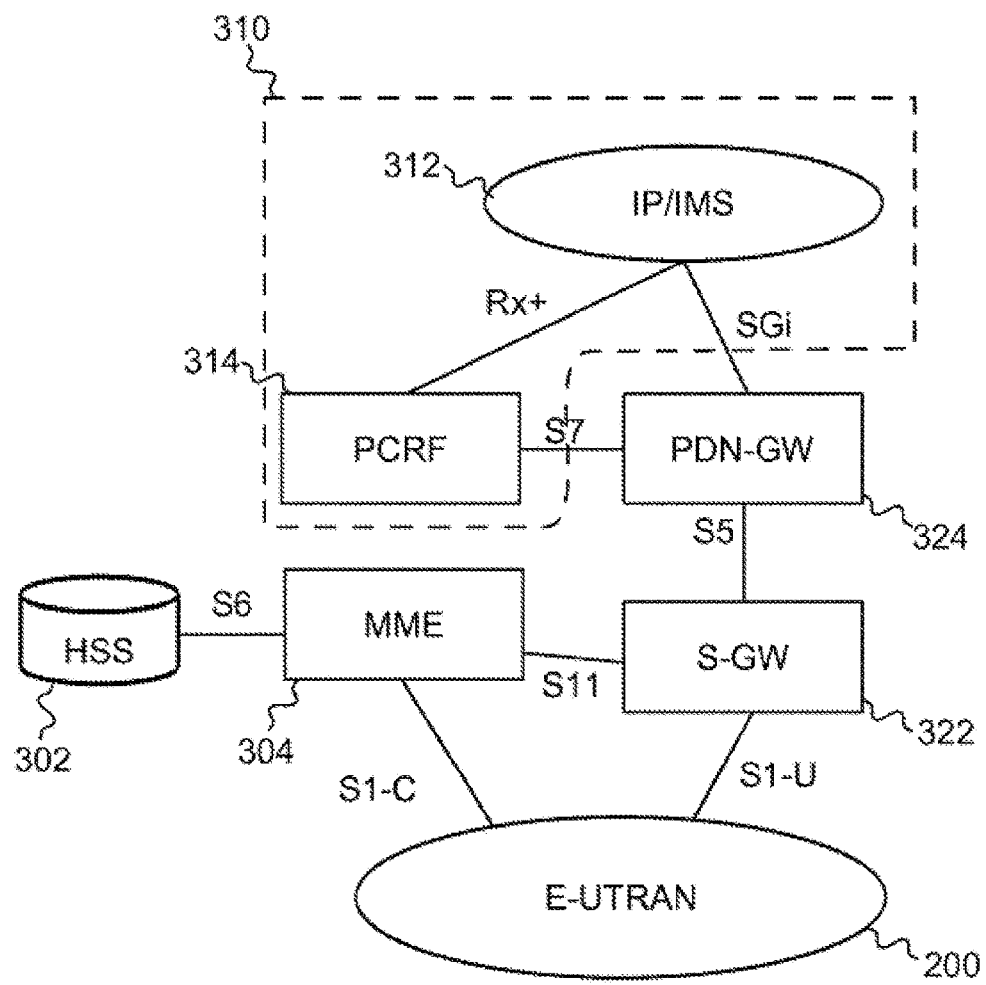
FIG. 2 shows a block diagram of one exemplary embodiment of a mobile communication system.

FIG. 2 illustrates one exemplary embodiment for establishing a data connection 110 in accordance with a quality criterion with the aid of dedicated radio resources in LTE. The provisioning of radio resources in accordance with a quality criterion (also called QoS provisioning) in LTE is supported by the concept of the IMS. In the exemplary embodiment, IMS is a basic framework for the management of multimedia services. The architecture of IMS provides three functionality groups: the creation of multimedia communications between endpoints which support IMS, the offering of platform-based services provided by the operator, and the linking to external networks. The IMS architecture comprises the Policy Decision Function (PDF), a logical unit that is responsible for the decision about the allocation of network resources and the management of quality criteria for different internet protocol-based data transfers. All end-to-end negotiations for setting up IMS sessions pass through the policy decision function, which both allows the creation of a service and is responsible for the performance of procedures in the mobile communication system which provide the quality criteria-conforming treatment of data services. In LTE this is a Policy and Charging Rule Function (PCRF) 314, for example, which in FIG. 2 is coupled to a component 312 representing an IMS via an "Rx+" interface and to a packet data network interface 324 (PDN GW, stands for Packet Data Network-GateWay) via an "S7" interface.

In the LTE exemplary embodiment, the activation of a radio connection which allows the differentiation of data services in accordance with quality criteria is initiated by the packet data network interface 324, e.g. because the IMS 312, or more specifically the policy and charging rule function 314, has communicated new rules. As soon as the packet data network interface 324 has received the inquiry, it transmits an inquiry for creating a radio connection to the service interface (S GW, stands for Serving-GateWay) 322, to which it is coupled via an "S5" interface. In this exemplary embodiment, S GW 322 then forwards a further inquiry for creating a radio connection to the mobility and management unit (MME, stands for Mobility Management Entity) 304, to which it is coupled via an "S11" interface. The mobility and management unit 304 then initiates the activation of a radio connection vis-d-vis the access network (RAN, stands for Radio Access Network), here the E UTRAN 200, to which it is coupled via the "S1-C" interface. For transferring the payload data, S-GW 322 is coupled to the E-UTRAN 200 via an "S1-U" interface.

In various exemplary embodiments, the relay transceiver 100 may be a mobile relay transceiver, for instance a small cell for vehicles (VSC, stands for Vehicular Small Cell). In this regard, under certain circumstances, the use of mobile relay transceivers for instance in motor vehicles, trains, ships and aircraft is conceivable since the use of a mobile communication system within these vehicles is made more difficult by the damping of the signals of the mobile communication system by the shell of the vehicles. In exemplary embodiments, a mobile relay transceiver may provide a radio cell, such that, for example, the occupants of the vehicle may use the mobile communication system, wherein an improvement in the linking to the mobile communication system may be achieved, under certain circumstances, by virtue of the better energy supply by the vehicle and the larger usable area for antennas, in comparison with a mobile transceiver without a mobile relay transceiver.

Figure 3:
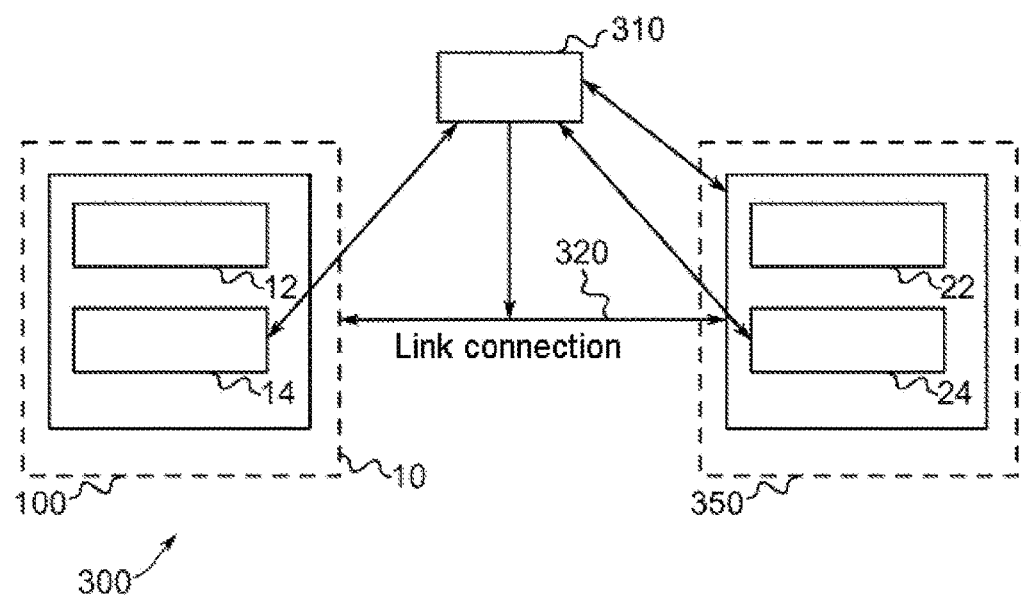
FIG. 3 shows a block diagram of one exemplary embodiment of a relay transceiver in a mobile communication system having a coordination module, a network component and a link connection.
Figure 5:
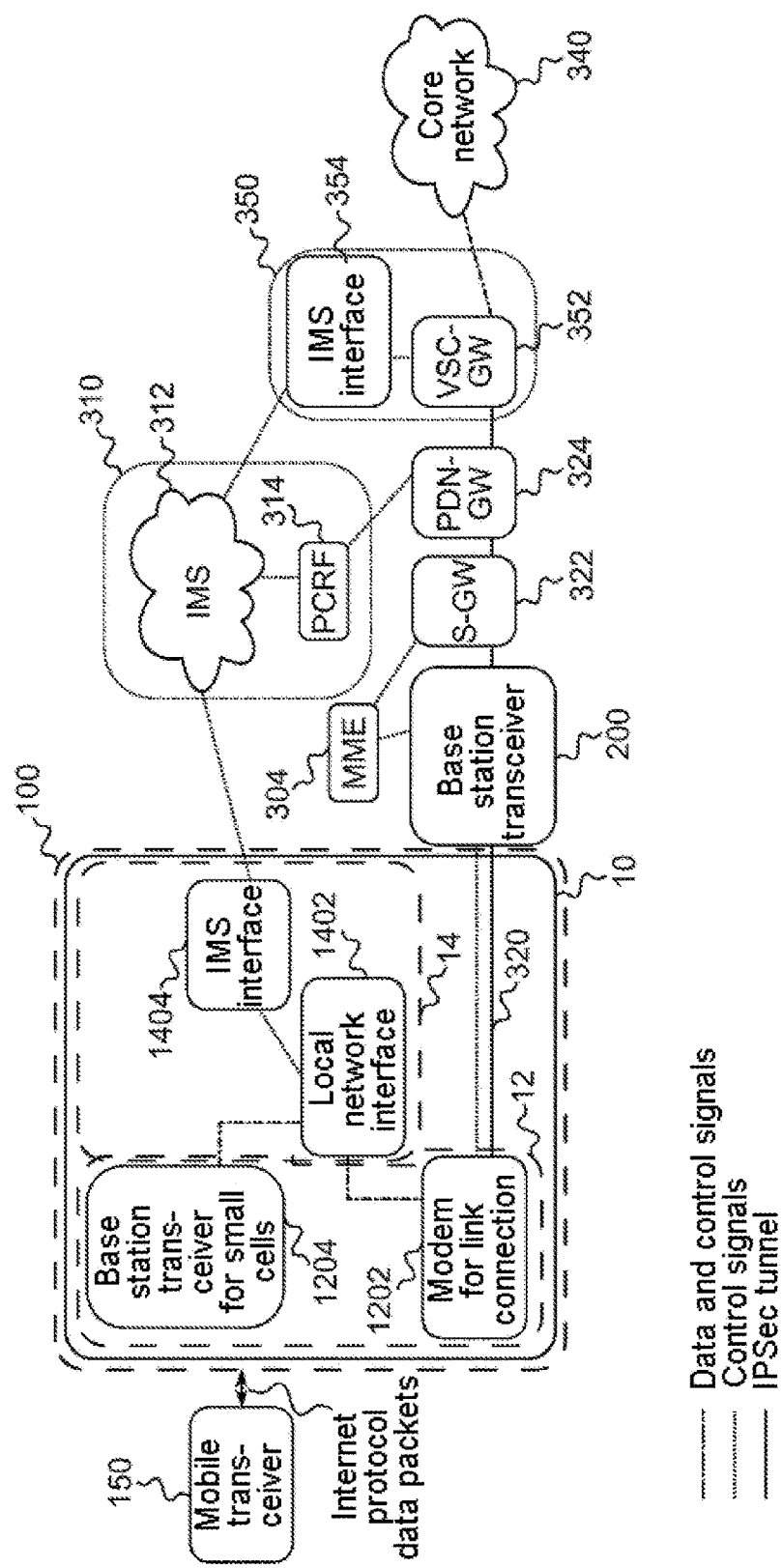
FIG. 5 shows a block diagram of one exemplary embodiment of a mobile communication system having a relay transceiver, a network component and various units and interfaces of a mobile communication system.
Figure 6:
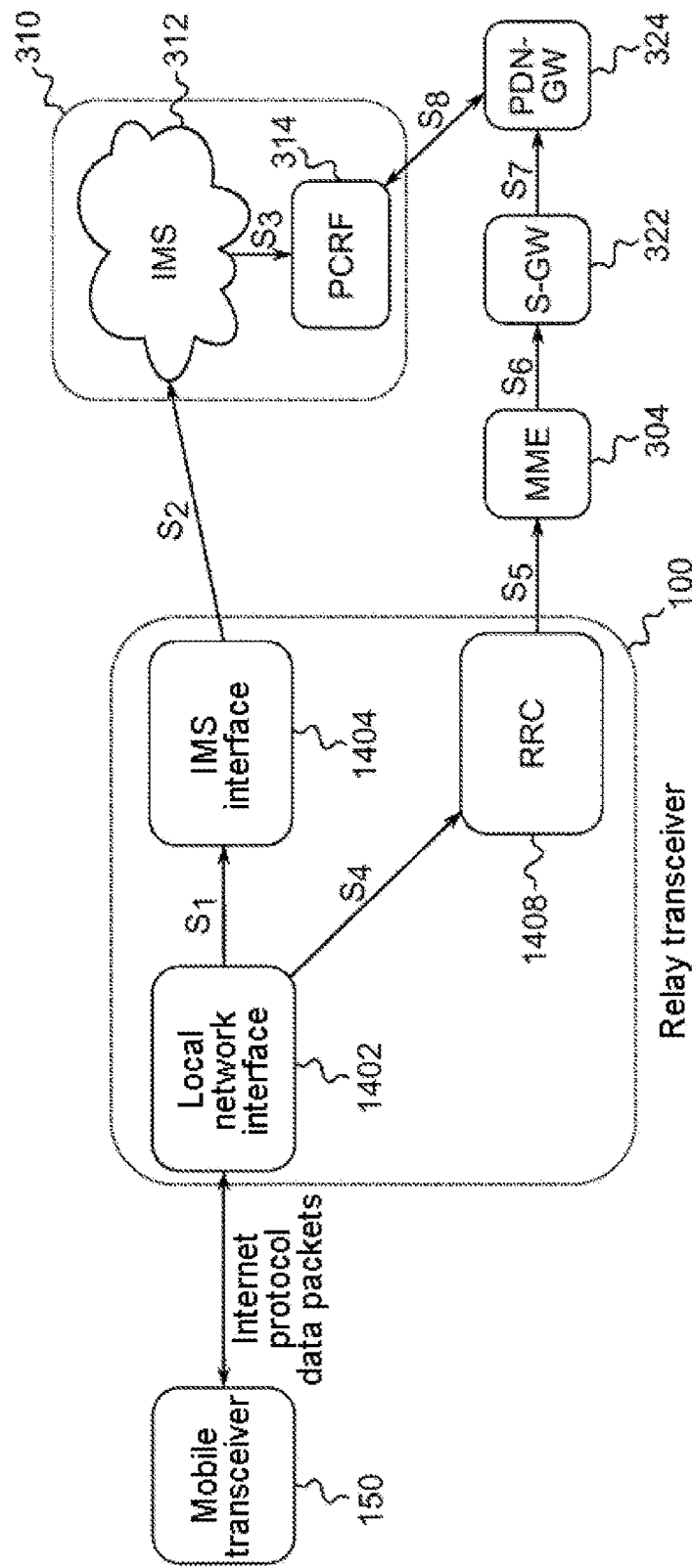
FIG. 6 shows a block diagram of a flowchart of one exemplary embodiment of a mobile communication system having a relay transceiver and various units and interfaces of a mobile communication system.

As shown in FIG. 3, in exemplary embodiments the mobile communication system 300 may furthermore have a coordination module 310, a link connection 320 and a network component 350. In this case, in exemplary embodiments the relay transceiver 100 may be connected via the link connection 320 to the network component 350 which receives the data packets of the mobile transceiver 150. In exemplary embodiments, in this case the network component 350 may constitute the interface between the link connection 320, and thus the relay transceiver 100, and the network of the operator of the mobile communication system. Further exemplary embodiments of the network component 350 will be explained in greater detail in the course of the text. In exemplary embodiments, the coordination module 310 may be designed to set up the data connection (110), which is part of the link connection 320, in accordance with the information about the quality criterion. In exemplary embodiments, the coordination module 310 may correspond for example to the internet protocol multimedia subsystem (IMS) together with a Policy and Charging Rule Function (PCRF), as illustrated in FIGS. 2, 5 and 6. The control module 14 may furthermore be designed to communicate the information about the quality criterion via an internet protocol multimedia subsystem interface 1404 to the coordination module 310, as is indicated by the arrow in FIG. 3.

In some exemplary embodiments, the control module 14 may be designed to determine the information about a quality criterion of a service associated with the data packet by extracting the quality criterion from the header data of the data packets. In this case, the header data may contain explicit quality criteria, for example a DiffServ classification (from Differentiated Services, DiffServ), such that the control module 14 may set up a data connection with strict quality criteria for data packets having a high priority, provided that this is supported by the radio technology, such as, for example, under LTE and in the Wireless Local Access Network (WLAN).

In exemplary embodiments, the control module 14 may furthermore be designed to determine the information about a quality criterion of a service associated with the data packet by pattern analysis of the contents of the data packets. In this case, in exemplary embodiments, the control module 14 may undertake a task of the packet data network interface 324 (PDN GW, stands for Packet Data Network-GateWay) and determine information about quality criteria with the aid of pattern recognition. In this case, by way of example, data traffic flow templates (TFT, stands for Traffic Flow Template) could be used for recognizing data services; in exemplary embodiments, the corresponding quality criterion could be determined by look-up in a value table.

In exemplary embodiments, the control module 14 may furthermore be designed to communicate via the data connection 110 in an encrypted manner. This may serve, in exemplary embodiments, to improve the security of the data packets on the link connection against interception. For this purpose, in exemplary embodiments, by way of example, one or more IPSec tunnels (Internet Protocol Security Tunnels) or tunnels or connections encrypted according to other encryption protocols may be used. In exemplary embodiments, thus for instance a separate IPSec tunnel corresponding to a respective quality criterion may be established on each data connection (110), or an IPSec tunnel may be established via a plurality of data connections (110), wherein the packets which correspond to the corresponding quality criterion are transferred in this case via the data connection (110). In exemplary embodiments, a data connection 110 may correspond for instance to a protocol conversion context for data transfer of packet data (also called Evolved Packet-switched System (EPS)-Bearer).

Figure 4:
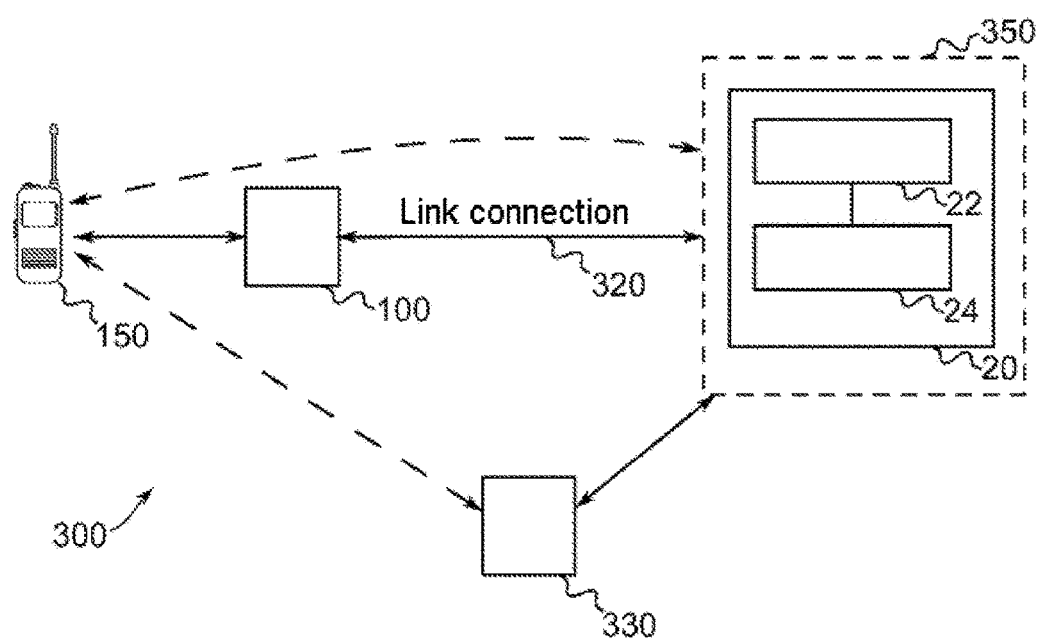
FIG. 4 shows a block diagram of one exemplary embodiment of a network component in a mobile communication system having a relay transceiver, a mobile transceiver, a link connection and a communication partner.

FIG. 4 illustrates one exemplary embodiment of a device 20 for a network component 350 for providing a data service to at least one mobile transceiver 150 in a mobile communication system 300. The mobile communication system furthermore has a relay transceiver 100. The device 20 comprises at least one interface module 22 designed to communicate with the at least one mobile transceiver 150 via the one relay transceiver 100 and to communicate with at least one communication partner 330 of the at least one mobile transceiver 150. In exemplary embodiments, a communication partner 330 may for instance correspond for example to the telephony infrastructure of the operator of the mobile communication system, the service provider of a data service, or a further mobile transceiver. In exemplary embodiments, the interface module 22 may correspond to a switching node (also called router) for data-packet-based data services, or a network bridge for switching data packets between two networks. In this case, the interface module 22 may constitute for example a transition between the networks of two operators of mobile communication systems, or for example the transition between a radio access network and the core network of a mobile communication system. The device 20 furthermore comprises a control module 24, which is coupled to the interface module 22 and which is designed to determine, on the basis of a data packet received from the at least one communication partner 330 of the at least one mobile transceiver 150, information about a quality criterion of a service associated with the data packet, and to establish, on the basis of the information about the quality criterion, a data connection 110 via a packet data network interface 324 of the mobile communication system 300 to the relay transceiver 100. In exemplary embodiments, the control module 24 may correspond to an arbitrary controller or processor or a programmable hardware component. By way of example, the control module 24 may also be realized as software that is programmed for a corresponding hardware component. In this respect, the control module 24 may be implemented as programmable hardware with correspondingly adapted software. In this case, arbitrary processors, such as digital signal processors (DSPs), may be used. In this case, exemplary embodiments are not restricted to a specific type of processor. Arbitrary processors or else a plurality of processors are conceivable for implementing the control module 24. In exemplary embodiments, the data connection 110 may correspond to a data connection across a plurality of network elements and network transitions (also called gateway), for example via packet data networks and via packet- and circuit-based radio networks, and for example also, as is illustrated in FIG. 5, via a modem 1202, a base station transceiver 200 and a service interface (also called Serving Gateway, S-GW) 322.

In some exemplary embodiments, the control module 24 may be designed to establish via the at least one interface module 22 and the packet data network interface 324 data connections 110 with different quality criteria to the mobile transceiver 150 via the relay transceiver 100. The control module 24 may for example furthermore be designed to establish, on the basis of the information about the quality criterion of the service associated with the data packet, at least one data connection 110 with a corresponding quality criterion to the relay transceiver 100 and to transfer data packets assigned to data services with identical quality criteria via the same link connection 320 to the relay transceiver 100. In this case, data packets may consist of header, payload and end data. Header data and header information may have information about the data packet, for example the source and the destination of the data packet, the length of the data packet, checking and recovery information, for example according to the Cyclic Redundancy Check (CRC) method. The payload data comprise the data which are intended to be transferred. Data services that may benefit from specific quality criteria, under certain circumstances, are for example voice telephony over the internet (VoIP, stands for Voice over Internet Protocol) and video and audio services.

In exemplary embodiments, the control module 24 may furthermore be designed to determine, on the basis of a plurality of received data packets, information about a plurality of quality criteria about a plurality of data services associated with the data packets, and to set up, on the basis of the information about the plurality of quality criteria, a plurality of data connections 110 to the relay transceiver 100. In this regard, the control module 24 may establish for example separate data connections for voice telephony, video services and other data packets which satisfy different quality criteria.

As is furthermore illustrated in FIG. 3, in exemplary embodiments, the mobile communication system 300 may furthermore have a coordination module 310. The coordination module 310 may be designed for example to set up the data connection 110 and thus also the link connection 320 in accordance with the information about the quality criterion. In exemplary embodiments, the coordination module 310 may be designed to set up the at least one data connection 110 in accordance with the information about the quality criterion. In exemplary embodiments, the coordination module 310 may correspond for example to the internet protocol multimedia subsystem (IMS) together with the Policy and Charging Rule Function (PCRF), as illustrated in FIGS. 2, 5 and 6. In this case, the control module 24 may furthermore be designed to communicate the information about the quality criterion via an internet protocol multimedia subsystem interface (354) to the coordination module 310.

In further exemplary embodiments, the control module 24 may be designed to determine the information about a quality criterion of a service associated with the data packet by extracting the quality criterion from the header data of the data packets. In this case, the header data may contain explicit quality criteria, for example a DiffServ classification, such that the control module 24 may set up a data connection with strict quality criteria for data packets having a high priority, provided that this is supported by the data transfer technology, such as, for example, under LTE and in the Wireless Local Access Network (WLAN).

The control module 24 may furthermore be designed to determine the information about a quality criterion of a service associated with the data packet by pattern analysis of the contents of the data packets. In this case, in exemplary embodiments, the control module 24 may undertake a task of the packet data network interface (PDN GW, stands for Packet Data Network-GateWay) and determine information about quality criteria with the aid of pattern recognition. In this case, by way of example, data traffic flow templates (TFT, stands for Traffic Flow Template) could be used for recognizing data services; in exemplary embodiments, the corresponding quality criterion could be determined by look-up in a value table.

In exemplary embodiments, the control module 24 may be designed to communicate via the link connection 320 in an encrypted manner. This may serve, in exemplary embodiments, to improve the security of the data packets on the link connection against interception. For this purpose, in exemplary embodiments, by way of example, one or more IPSec tunnels (Internet Protocol Security Tunnels) or tunnels encrypted according to other encryption protocols may be used. In exemplary embodiments, thus for instance a separate IPSec tunnel corresponding to a respective quality criterion may be established on each data connection (110), or an IPSec tunnel may be established via a plurality of data connections (110), wherein the packets which correspond to the corresponding quality criterion are transferred in this case via the data connection (110). In exemplary embodiments, a data connection 110 may correspond for instance to a protocol conversion context for data transfer of packet data (also called Evolved Packet-switched System (EPS)-Bearer).

FIGS. 5 and 6 illustrate exemplary embodiments of a relay transceiver 100 in a network environment. In this case, FIG. 5 shows a mobile transceiver 150, which communicates data packets with a relay transceiver 100 in accordance with the above description. In this case, the relay transceiver 100 comprises the device 10. In FIG. 5, the device 10 comprises a base station transceiver for small cells 1204, a modem for a link connection 1202, a local network interface 1402 and an IMS interface 1404. In this case, the transceiver module 12 may comprise the base station transceiver for small cells 1204 and the modem for a link connection. In exemplary embodiments, the control module 14 may comprise the local network interface 1402 and the IMS interface 1404, and simultaneously control and supervise the components of the transceiver module 12. The link connection 320 leads from the base station transceiver for small cells 1204 via a modem 1202, a base station transceiver 200, an S-GW 322, a PDN-GW 324 to a VSC-GW 352, which together with a further IMS interface 354 is comprised by the network component 350. In this case, in exemplary embodiments, the link connection 320 may be encrypted, for example by one or more IPSec tunnels. In exemplary embodiments, the link connection 320 in this case uses one or more data connections 110 leading from the modem 1202 via the base station transceiver 200 and the S-GW 322 to the PDN GW 324. The VSC GW 352 is furthermore coupled to a core network 340. A coordination module 310 is coupled to the two IMS interfaces 1404 and 354 and comprises an IMS 312 and a PCRF 314, which is in turn coupled to the PDN GW 324. The base station transceiver 200 is furthermore coupled to an MME 304. In FIG. 6, identical reference signs designate components identical to those in FIG. 5. FIG. 6 additionally illustrates a Radio Resource Control (RRC) unit 1408, which is coupled to the local network interface 1402 via an "S4" interface, and an "S1" interface between the local network interface 1402 and the IMS interface 1404.

The example of a relay transceiver 100 for a vehicle (VSC, stands for Vehicular Small Cell) is chosen here as an exemplary embodiment of a relay transceiver 100. In order to resolve the limitations known from the art with regard to the prioritization of data packets, in the exemplary embodiments that will now follow two new subunits of the relay transceiver 100 are proposed, a local network interface 1402 and an IMS interface 1404.

The local network interface 1402 would be responsible for example for the identification of the different data services which are used by the mobile transceivers 150. The differentiation of users would be trivial, in exemplary embodiments; a differentiation of the data services would be realized by the following procedures:

Extracting the quality criterion from the header data of the data packets. The header data may in this case contain explicit quality criteria, for example a DiffServ classification, such that the local network interface 1402 may set up a data connection with strict quality criteria for data packets having a high priority, provided that this is supported by the radio technology, such as, for example, under LTE and in the Wireless Local Access Network (WLAN).

Determining information about a quality criterion of a service associated with the data packet by pattern analysis of the contents of the data packets. In this case, in exemplary embodiments, the local network interface 1402 may undertake a task of the packet data network interface 324 (PDN GW, stands for Packet Data Network-GateWay) and determine information about quality criteria with the aid of pattern recognition. In this case, by way of example, data traffic flow templates (TFT, stands for Traffic Flow Template) could be used for recognizing data services; in exemplary embodiments, the corresponding 5-tuple of the quality criterion could be determined by look-up in a value table. In exemplary embodiments, this procedure may also be used in the case of wired femtocells.

As soon as the local network interface 1402 of the mobile relay transceiver 100 has identified the need for a dedicated radio resource (also called dedicated bearer) for a data connection 110 on the link connection 320 for the transfer of data packets whose quality criterion corresponds to specific requirements, in exemplary embodiments the mobile relay transceiver 100 could perform a function at the application level in order to use a dedicated radio resource additionally for the data connection 110 and the link connection 320. In order to provide clarity, the description will now be subdivided into the downlink and the uplink.

As soon as the local network interface 1402 has ascertained that the data packets of a data service require a data connection with new quality criteria, in exemplary embodiments the local network interface 1402 may notify the IMS interface 1404 and later also the modem 1202 for the link connection (s1 and s4 in FIG. 6) to effect corresponding inquiries to the mobile communication system 300. If said inquiries are accepted, then the inquiry activates for example either the procedure to provide a dedicated radio resource or the procedure to adapt the parameters of a dedicated radio resource.

The procedure such as may take place in exemplary embodiments is explained in greater detail hereinafter: as soon as the IMS interface 1404 in the mobile relay transceiver 100 having the device 10 described above receives an inquiry of the local network interface 1402, it negotiates for example with the IMS interface 354 of the network component 350 the use of the services via specific session signal protocols (s2). At the application level, this exemplary embodiment provides for using provided fields in the Session Description Protocol (SDP) for information about a description of the service. At the application level, in exemplary embodiments, the mobile relay transceiver 100 and the network component 350 negotiate the information about the quality criteria and the patterns for the pattern recognition (TFT) which uses the link connection 320 for example in a packet data network interface (PDN GW) 324 in LTE.

This information may furthermore be used by an IMS 312 in order to provide a policy and charging rule function (PCRF) 314 with the information about the data service (s3).

As soon as the quality criteria have been negotiated at the application level, the local network interface 1402 in the mobile relay transceiver 100, in exemplary embodiments, may use the results of the negotiations about the quality criteria to instruct the mobility and management unit (MME, stands for Mobility and Management Entity) 304 to utilize new radio resources or to change existing radio resources, for which, on the part of the link connection of the mobile relay transceiver 100, the radio resource control (RRC) unit 1408 may be responsible (s5).

In exemplary embodiments of the mobility and management unit 304, via the radio resource control unit 1408, in an inquiry with respect to a radio resource change, the local network interface 1402 may communicate both information about the pattern recognition (TFT) and information about quality criteria class identifier (QCI, stands for Quality of Service Class Identifier) and guaranteed bit data rate (GBR, stands for Guaranteed Bit Rate). As soon as the mobility and management unit 304 has received the information, it may forward said information, in exemplary embodiments, to the service interface (S-GW, stands for Serving Gateway) 322 and further to the packet data network interface 324 (s6 and s7). The packet data network interface 324 may then furthermore ask the policy and charging rule function 314 for permission and receive from there the results of the details negotiated at the application level (s8). With this information, in exemplary embodiments, the packet data network interface 324 may then initiate the procedures for utilizing radio resources or for setting up a connection, in order to establish a data connection (110). Then, in exemplary embodiments, the packet data network interface 324 may forward the data packets of the different data services on the correct connections in accordance with their quality criteria.

In the uplink, the procedure is similar in some exemplary embodiments. As soon as the local network interface 1402 determines data packets with new quality criteria in exemplary embodiments, the local network interface 1402 may initiate the negotiation of the quality criteria between the mobile relay transceiver 100 and the network component 350 via the IMS 312. In this case, by way of example, the policy and charging rule function 314 of the LTE network, which function concomitantly instigates the data connection 110, may also be involved. In some exemplary embodiments, the policy and charging rule function 314 then defines the policies for the connection. As soon as the quality criteria have been negotiated, the local network interface 1402, in exemplary embodiments, may communicate the details of the quality criteria and of the patterns (TFT) to the radio resource control unit 1408 that controls the radio connection. Under certain circumstances, that generates an inquiry for changing a radio resource to the mobility and management unit 304. Since the policy and management unit 314 knows the negotiated details, it could accept the inquiry and set up the dedicated radio resource/radio connection or change the parameters of a dedicated radio resource/radio connection. Then, in exemplary embodiments, the local network interface 1402 of the mobile relay transceiver 100 may forward the data packets of the different data services on the correct connections in accordance with their quality criteria.

Figure 7:
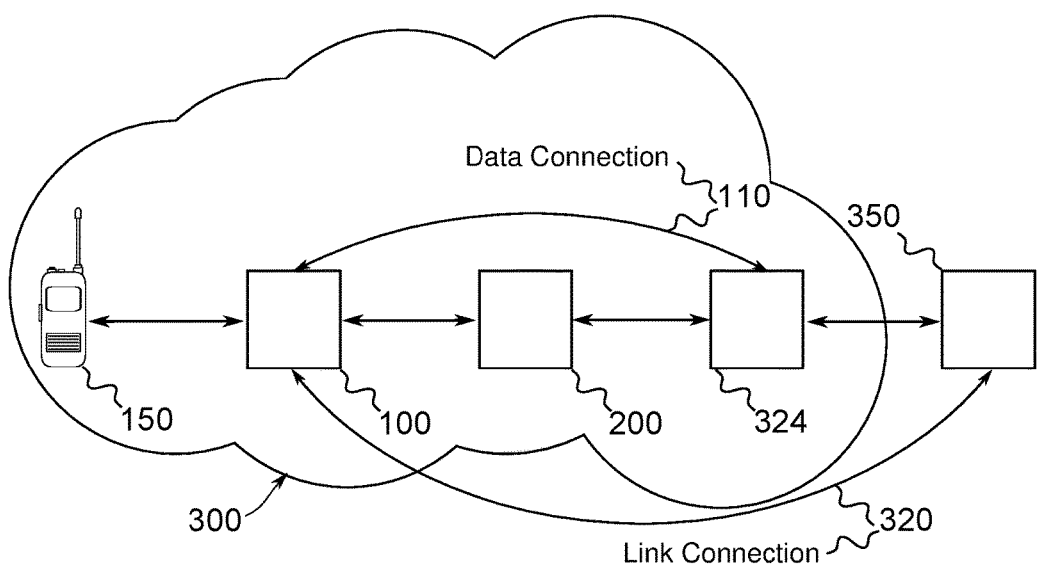
FIG. 7 shows a block diagram of one exemplary embodiment of a mobile communication system with link connection and data connection.

FIG. 7 illustrates, in exemplary embodiments, the difference between the link connection 320, which leads from the relay transceiver 100 via the base station transceiver 200 and the packet data network interface 324 to the network component 350, and the data connection 110, which leads from the relay transceiver 100 via the base station transceiver 200 to the packet data network interface 324. In this case, relay transceiver 100, base station transceiver 200, packet data network interface 324 are comprised in a mobile communication system 300 which further has at least one mobile transceiver 150.

Figure 8:
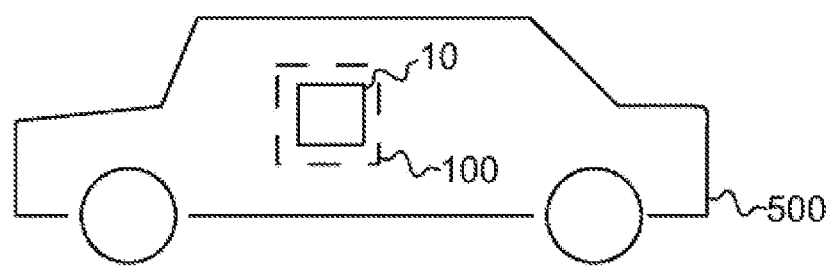
FIG. 8 shows one exemplary embodiment of a vehicle having a mobile relay transceiver with the device for the mobile relay transceiver.
Figure 9:
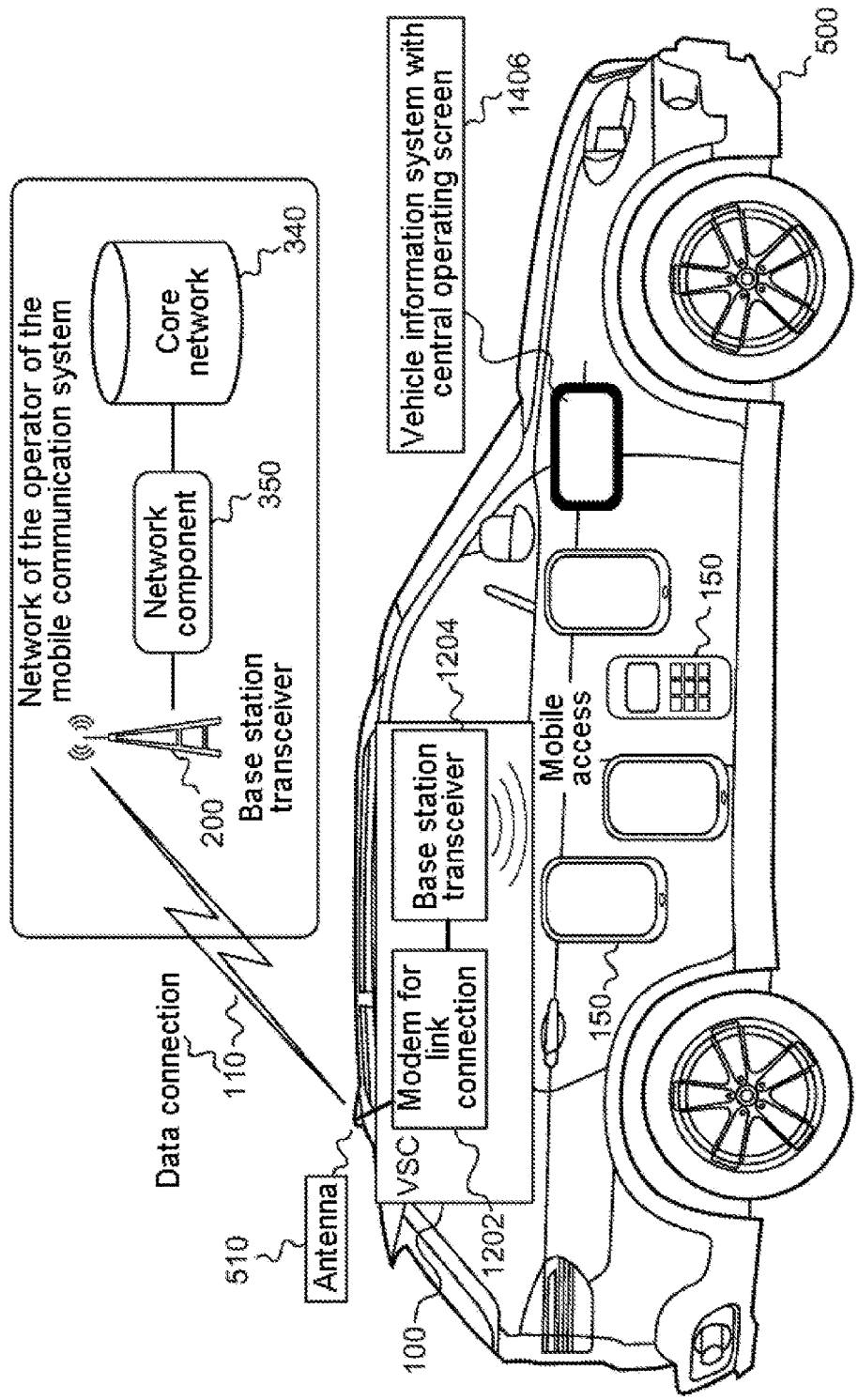
FIG. 9 shows one exemplary embodiment of a vehicle having a mobile relay transceiver, and also a plurality of elements and interfaces of a mobile communication system.

FIGS. 8 and 9 illustrate one exemplary embodiment of a vehicle 500 comprising a device according to claim 1, wherein the relay transceiver 100 is a mobile relay transceiver that communicates with the mobile transceivers of the vehicle occupants. In exemplary embodiments, in this case the use of mobile relay transceivers in vehicles is not restricted to motor vehicles, but rather under certain circumstances is for instance also conceivable in trains, ships and aircraft, since the use of a mobile communication system in exemplary embodiments also within said vehicles is made more difficult by the damping of the signals of the mobile communication system by the shell of the vehicles. In exemplary embodiments, a mobile relay transceiver may provide a radio cell, such that, for example, the occupants of the vehicle may utilize the mobile communication system, wherein an improvement in the linking to the mobile communication system may be achieved, under certain circumstances, by virtue of the better energy supply by the vehicle and the larger usable area for antennas, in comparison with a mobile transceiver without a mobile relay transceiver.

FIG. 9 further illustrates the transceiver module 12, which, in exemplary embodiments, has a link connection modem (modulator-demodulator) 1202 and a base station transceiver for small cells (also called small cell base station) 1204. In this case, the link connection modem 1202 communicates via an antenna 510 with the base station transceiver 200. The core network 340 of the operator of the mobile communication system constitutes the connection network via which data are exchanged with the communication partners 330 of the mobile transceivers.

FIG. 10 shows a flowchart of one exemplary embodiment of a method for a relay transceiver 100 in a mobile communication system 300. The mobile communication system 300 furthermore has a base station transceiver 200 and a packet data network interface 324. The method comprises communicating 32 with at least one mobile transceiver 150 and communicating 34 with the base station transceiver 200. The method furthermore comprises determining 36 information about a quality criterion of a service associated with a data packet received from the at least one mobile transceiver (150). The method furthermore comprises establishing 38 a data connection 110 to the packet data network interface 324 via the base station transceiver 200 on the basis of the information about the quality criterion.

FIG. 11 shows a flowchart of one exemplary embodiment of a method for a network component 350 for providing a data service to at least one mobile transceiver 150 in a mobile communication system 300. The mobile communication system furthermore has a relay transceiver 100. The method comprises communicating 42 via the one relay transceiver 100 with the at least one mobile transceiver 150 and communicating 44 with at least one communication partner 330 of the at least one mobile transceiver 150. The method furthermore comprises determining 46 information about a quality criterion of a service associated with a data packet received from the at least one communication partner 330 of the at least one mobile transceiver 150. The method furthermore comprises establishing 48 a data connection 110 via a packet data network interface 324 of the mobile communication system 300 to the relay transceiver 100 on the basis of the information about the quality criterion.

A further exemplary embodiment is a computer program for carrying out at least one of the methods described above when the computer program runs on a computer, a processor or a programmable hardware component. A further exemplary embodiment is also a digital storage medium which is machine- or computer-readable and which has electronically readable control signals which can interact with a programmable hardware component such that one of the methods described above is performed.

The features disclosed in the description above, the following claims and the accompanying figures may be of importance and implemented both individually and in arbitrary combination for the realization of an exemplary embodiment in the various configurations thereof.

Although some aspects have been described in association with a device, it goes without saying that these aspects also constitute a description of the corresponding method, and so a block or a component of a device should also be understood as a corresponding method step or as a feature of a method step. Analogously thereto, aspects that have been described in association with or as a method step also constitute a description of a corresponding block or detail or feature of a corresponding device.

Depending on specific implementation requirements, exemplary embodiments of the invention may be implemented in hardware or in software. The implementation may be carried out using a digital storage medium, for example a floppy disk, a DVD, a Blu-Ray disk, a CD, a ROM, a PROM, an EPROM, an EEPROM or a FLASH memory, a hard disk or some other magnetic or optical store on which electronically readable control signals are stored which can interact or interact with a programmable hardware component in such a way that the respective method is carried out.

A programmable hardware component may be formed by a processor, a computer processor (CPU=Central Processing Unit), a graphics processor (GPU=Graphics Processing Unit), a computer, a computer system, an application-specific integrated circuit (ASIC), an integrated circuit (IC), a single-chip system (SOC=System-on-Chip), a programmable logic element or a field programmable gate array (FPGA) with a microprocessor.

The digital storage medium may therefore be machine- or computer-readable. Some exemplary embodiments thus comprise a data carrier having electronically readable control signals that are able to interact with a programmable computer system or a programmable hardware component in such a way that one of the methods described herein is carried out. One exemplary embodiment is thus a data carrier (or a digital storage medium or a computer-readable medium) on which the program for carrying out one of the methods described herein is recorded.

Generally, exemplary embodiments of the present invention may be implemented as program, firmware, computer program or computer program product comprising a program code or as data, wherein the program code or the data is or are effective to the extent of carrying out one of the methods when the program runs on a processor or a programmable hardware component. The program code or the data may for example also be stored on a machine-readable carrier or data carrier. The program code or the data may be present, inter alia, as source code, machine code or byte code and as some other intermediate code.

A further exemplary embodiment is furthermore a data stream, a signal sequence or a sequence of signals constituting the program for carrying out one of the methods described herein. The data stream, the signal sequence or the sequence of signals may be configured for example to the effect of being transferred via a data communication connection, for example via the internet or some other network. Exemplary embodiments are thus also signal sequences which represent data and which are suitable for communication via a network or a data communication connection, wherein the data constitute the program.

A program in accordance with one exemplary embodiment may implement one of the methods during its performance for example by virtue of the fact that it reads memory locations or writes a datum or a plurality of data thereto, as a result of which possibly switching processes or other processes are brought about in transistor structures, in amplifier structures or in other electrical components, optical components, magnetic components or components that operate according to some other functional principle. Accordingly, by reading a memory location, it is possible for data, values, sensor values or other information to be acquired, determined or measured by a program. A program can therefore acquire, determine or measure variables, values, measurement variables and other information by reading from one or more memory locations and also, by writing to one or more memory locations, can bring about, instigate or carry out an action and also drive other apparatuses, machines and components.

The exemplary embodiments described above merely constitute an illustration of the principles of the present invention. It goes without saying that modifications and variations of the arrangements and details described herein will become apparent to others skilled in the art. Therefore, the intention is that the invention shall be restricted only by the scope of protection of the following patent claims and not by the specific details that have been presented on the basis of the description and the explanation of the exemplary embodiments herein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for a relay transceiver in a mobile communication system, wherein the mobile communication system comprises a base station transceiver and a packet data network interface, the device comprising:
   at least one transceiver module configured to communicate with at least one mobile transceiver and with the base station transceiver; and
   a control module configured to:
      determine, on the basis of a data packet received by the at least one mobile transceiver, information about a quality criterion of a service associated with the data packet,
      establish, via the at least one transceiver module, a plurality of simultaneously active data connections having different quality criteria to the packet data network interface via the base station transceiver, wherein at least one of the data connections is established on the basis of the information about the quality criterion, and
      cause the transfer of data packets assigned to services with identical quality criteria to the data packet via the at least one data connection.

2. The device as claimed in claim 1, wherein the control module is further configured to:
   determine, on the basis of received additional data packets, information about respective quality criteria of respective data services associated with the additional data packets; and
   set up, on the basis of the information about the respective quality criteria, the plurality of simultaneously active data connections to the packet data network interface via the base station transceiver.

3. The device as claimed in claim 1, wherein the relay transceiver is a mobile relay transceiver.

4. The device as claimed in claim 1, wherein the mobile communication system further comprises a coordination module, a link connection and a network component, wherein the relay transceiver is connected via the link connection to the network component, which receives the data packets of the mobile transceiver,
   wherein the coordination module is configured to set up the at least one data connection in accordance with the information about the quality criterion, and
   wherein the control module is further configured to communicate the information about the quality criterion via an internet protocol multimedia subsystem interface to the coordination module.

5. The device as claimed in claim 1, wherein the control module further is configured to at least one of:
   determine the information about the quality criterion of the service associated with the data packet by extracting the quality criterion from the header data of the data packet, and
   determine the information about the quality criterion of the service associated with the data packet by pattern analysis of the content of the data packet.

6. The device as claimed in claim 1, wherein the control module is configured to communicate in an encrypted fashion via the data connection.

7. A device for a network component for providing a data service to at least one mobile transceiver in a mobile communication system, wherein the mobile communication system has a relay transceiver, the device comprising:
   at least one interface module configured to communicate via the one relay transceiver with the at least one mobile transceiver, and to communicate with at least one communication partner of the at least one mobile transceiver; and
   a control module configured to:
      determine, on the basis of a data packet received by the at least one communication partner of the at least one mobile transceiver, information about a quality criterion of a service associated with the data packet,
      establish, via the at least one interface module, a plurality of simultaneously active data connections having different quality criteria to the mobile transceiver via the relay transceiver, wherein at least one of the data connections is established on the basis of the information about the quality criterion, and
      cause the transfer of data packets assigned to services with identical quality criteria to the data packet via the at least one data connection.

8. The device as claimed in claim 7, wherein the control module is further configured to:
   determine, on the basis of received additional data packets, information about respective quality criteria respective data services associated with the additional data packets; and
   set up, on the basis of the information about the respective quality criteria, the plurality of simultaneously active data connections to the relay transceiver.

9. The device as claimed in claim 7, wherein the mobile communication system further comprises a coordination module,
   wherein the coordination module is configured to set up the at least one data connection in accordance with the information about the quality criterion, and
   wherein the control module is further configured to communicate the information about the quality criterion via an internet protocol multimedia subsystem interface to the coordination module.

10. The device as claimed in claim 7, wherein the control module is further configured to at least one of:

determine the information about the quality criterion of the service associated with the data packet by extracting the quality criterion from the header data of the data packets; and determine the information about the quality criterion of the service associated with the data packet by pattern analysis of the content of the data packet.

11. The device as claimed in claim 7, wherein the control module is configured to communicate in an encrypted fashion via the link connection.

12. A method for a network component for providing a data service to at least one mobile transceiver in a mobile communication system, wherein the mobile communication system has a relay transceiver, the method comprising the acts of:

communicating, via the relay transceiver, with the at least one mobile transceiver;

communicating with at least one communication partner of the at least one mobile transceiver;

determining information about a quality criterion of a service associated with a data packet received by the at least one communication partner of the at least one mobile transceiver;

establishing, via a packet data network interface of the mobile communications system, a plurality of simultaneously active data connections having different quality criteria to the relay transceiver, wherein at least one of the data connections is established on the basis of the information about the quality criterion; and causing the transfer of data packets assigned to services with identical quality criteria to the data packet via the at least one data connection.

13. The method as claimed in claim 12, further comprising:

determining, on the basis of received additional data packets, information about respective quality criteria of respective data services associated with the additional data packets; and set up, on the basis of the information about the respective quality criteria, the plurality of data simultaneously active connections to the relay transceiver.

14. The method as claimed in claim 12, further comprising:

determining the information about the quality criterion of the service associated with the data packet by at least one of extracting the quality criterion from the header data of the data packet and by performing pattern analysis of the content of the data packet.

* * * * *